United States Patent [19]

Coulon

[11] Patent Number: 4,832,993

[45] Date of Patent: May 23, 1989

[54] METHOD OF APPLYING A PROTECTIVE COATING TO A TITANIUM ALLOY BLADE, AND A BLADE OBTAINED THEREBY

[75] Inventor: André Coulon, Bessoncourt, France

[73] Assignee: Alsthom, Paris Cedex, France

[21] Appl. No.: 165,960

[22] Filed: Mar. 9, 1988

[30] Foreign Application Priority Data

Mar. 9, 1987 [FR] France .................................. 87 03172

[51] Int. Cl.$^4$ .......................... B05D 3/06; B05D 3/02; B63H 1/26; B64C 27/46

[52] U.S. Cl. .................................. 427/53.1; 427/45.1; 427/126.1; 416/241 R; 416/224

[58] Field of Search ............... 416/241 R, 241 B, 224; 427/53.1, 45.1, 46, 124, 126.1, 126.2, 126.6, 250, 255.1, 255.2

[56] References Cited

U.S. PATENT DOCUMENTS

| | | | |
|---|---|---|---|
| 4,123,595 | 10/1978 | Chang | 428/667 |
| 4,233,342 | 11/1980 | Aichert et al. | 427/251 |
| 4,241,110 | 12/1980 | Ueda et al. | 427/203 |
| 4,300,474 | 11/1981 | Livsey | 427/53.1 |
| 4,429,019 | 1/1984 | Schrewelius et al. | 428/550 |
| 4,446,199 | 5/1984 | Gedwill et al. | 428/639 |
| 4,492,522 | 1/1985 | Rossmann et al. | 416/241 R |
| 4,563,801 | 1/1986 | Schill et al. | 29/156.8 B |
| 4,613,388 | 9/1986 | Walter et al. | 148/425 |
| 4,615,903 | 10/1986 | Miller | 427/53.1 |
| 4,710,103 | 12/1987 | Faber et al. | 416/241 R |
| 4,743,733 | 5/1988 | Mehta et al. | 427/53.1 |
| 4,745,033 | 5/1988 | Timmons | 428/552 |

FOREIGN PATENT DOCUMENTS

| | | | |
|---|---|---|---|
| 0141368 | 8/1983 | Japan | 416/241 R |
| 0113802 | 5/1987 | Japan | 416/241 R |
| 0165508 | 7/1987 | Japan | 416/241 R |

Primary Examiner—Norman Morgenstern
Assistant Examiner—Marianne L. Padgett
Attorney, Agent, or Firm—Sughrue, Mion, Zinn, Macpeak, and Seas

[57] ABSTRACT

The portion of the blade (1) to be coated has pure vanadium powder deposited thereon and the temperature of the powder is raised to a temperature which is slightly higher than the melting point of vanadium. Thereafter, a powder mixture is deposited on the vanadium layer, said powder comprising about one third by weight of titanium carbides, titanium nitrides, or titanium borides, which are bonded by a martensitic or austenomartensitic stainless steel. The powder is then raised to a temperature which is greater than its melting temperature and less than the melting temperature of vanadium. A titanium alloy blade it includes, on its periphery, a coating layer (5) which is at least 1 mm thick and which includes about one third by weight titanium carbides, or titanium nitrides, or titanium borides bonded by a martensitic or austenomartensitic stainless steel, said coating layer covering an under layer (6) of vanadium having a thickness lying between 0.5 mm and 1.5 mm. The resulting blade is highly resistant to abrasion by water droplets.

3 Claims, 2 Drawing Sheets

METHOD OF APPLYING A PROTECTIVE COATING TO A TITANIUM ALLOY BLADE, AND A BLADE OBTAINED THEREBY

REFERENCE TO RELATED APPLICATIONS

This invention relates to co-pending application Ser. No. 054,926, filed May 28, 1987, and entitled "Protectable Tip For A Titanium Blade And A Method Of Braising Such A Tip", and application Ser. No. 054,963, filed May 28, 1987, entitled "A Method Of Laying A Cobalt-Chromium Tungsten Protective Coating On A Blade Made Of Tungsten Alloy, Including Vanadium, And A Blade Coated Thereby".

The present invention relates to a method of applying a protective coating on a titanium alloy blade, and to a blade obtained thereby.

BACKGROUND OF THE INVENTION

Titanium alloy blades have the advantage of having a high strength/density ratio and also of having remarkable mechanical performance in highly corrosive surroundings.

However, titanium alloy blades used in steam turbines, in particular when their peripheral speeds are high, are rapidly damaged by the droplets of water that form in the steam.

It is therefore necessary to protect the peripheries of such blades.

SUMMARY OF THE INVENTION

The present invention provides a titanium alloy blade, including on its periphery a coating layer which is at least 1 mm thick and which includes about one third by weight titanium carbides, or titanium nitrides, or titanium borides bonded by a martensitic or austenomartensitic stainless steel, said coating layer covering an under layer of vanadium having a thickness lying between 0.5 mm and 1.5 mm.

This coating is applied by the following method: vanadium powder is deposited on the portion of the blade to be coated, and the temperature of the power is raised to a temperature which is slightly higher than the melting point of vanadium.

Thereafter, a heterogeneous mixture of powder comprising about one third by weight titanium carbides or titanium nitrides or titanium borides bonded by a martensitic or austenomartensitic stainless steel including, in particular, chromium and optionally cobalt and/or molybdenum and/or nickel is deposited on the layer of vanadium; this powder is raised to a temperature which is higher than its melting temperature but less than the melting temperature of vanadium.

By this method, a minimal quantity of vanadium is diluted in the titanium alloy blade during the first stage. Similarly, during the second stage, the dilution of the alloy in the vanadium under layer is very limited. Further, the melting of this alloy layer has no effect on the bonding already achieved between the vanadium under layer and the blade.

In order to limit dilution as much as possible, it is preferable to use rapid and localized heating, for example high frequency induction heating (using a moving inductor) or laser beam heating.

BRIEF DESCRIPTION OF THE DRAWINGS

An implementation of the invention is described by way of example with reference to the accompanying drawings, in which.

MORE DETAILED DESCRIPTION

Figure 1:
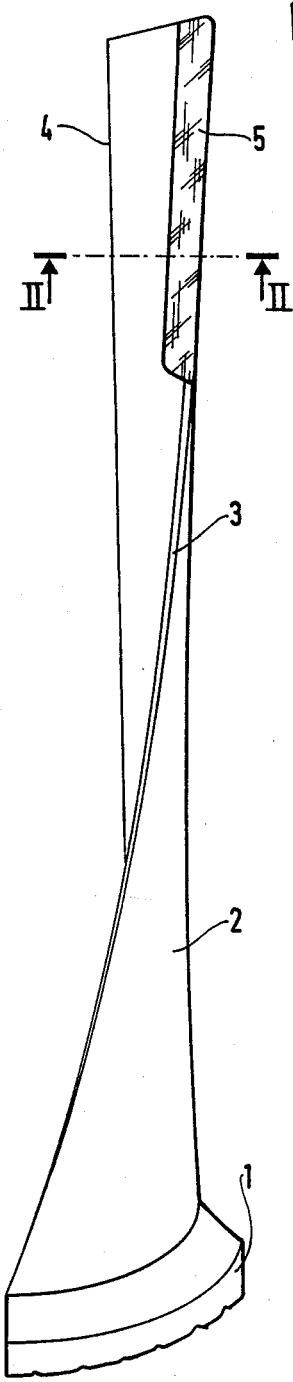
FIG. 1 is a perspective view of a blade in accordance with the invention.
Figure 2:
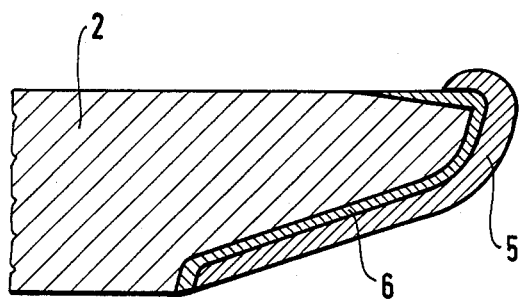
FIG. 2 is a section through the FIG. 1 blade.

The steam turbine blade shown in FIG. 1 comprises a root 1 and a twisted vane 2 including a leading edge 3 and a trailing edge 4. A protective coating layer 5 has been deposited at the top of the blade along the compression side of the leading edge 3. This coating layer on the leading edge may extend over the suction face of the vane 2. An under layer 6 of vanadium is disposed between the vane and the final coating (FIG. 2).

The blade is made of a titanium alloy comprising 6% aluminum and between 3.5% and 4.5% vanadium.

The method of applying the protective coating in a nonlimiting laser beam re-melting example, is as follows:

The surface of the blade to be coated is prepared in conventional manner and then substantially pure (>98%) vanadium powder is projected onto said surface, under a laser beam, said powder being constituted by spherical grains which are less than 0.5 $\mu$m in size. The quantity deposited by remelting is sufficient to ensure that the thickness of the final vanadium under layer 6 is greater than 1 mm.

A $CO_2$ laser beam 9 is directed onto the surface of the vane 2 of the blade to be coated. The beam 7 is surrounded by an inlet 10 for an inert gas, e.g. argon, which also strikes the vane 2 (see FIG. 4).

A nozzle 11 projects the powder onto the surface of the vane that is to be coated.

The inert atmosphere serves to avoid unwanted reactions with oxygen, hydrogen, or nitrogen.

Figure 3:
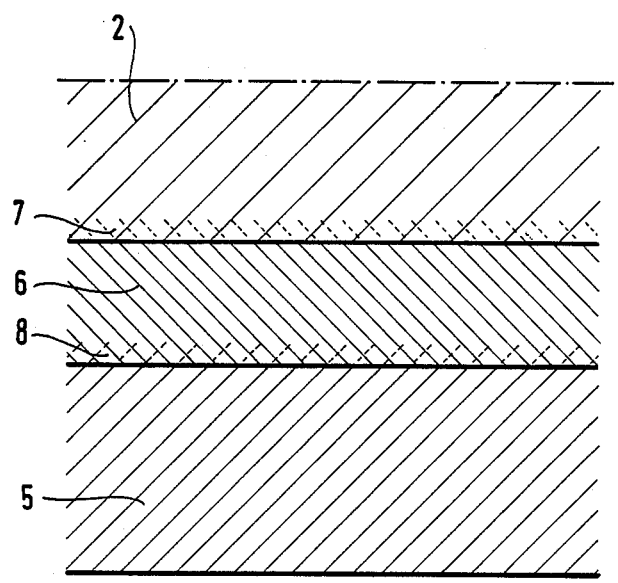
FIG. 3 is a fragmentary view of the FIG. 2 section.

The temperature of the vanadium powder is thus raised to between 1950° C. and 2000° C. The melting temperature of vanadium is 1900° C. while the melting temperature of the titanium alloy is about 2400° C. As a result the vanadium melts while the titanium alloy substrate remains semisolid, and this is ideal for obtaining perfect fastening with low dilution of vanadium into the substrate. The titanium alloy which contains about 4% vanadium can tolerate a limited quantity of vanadium by dilution (see FIG. 3) giving rise locally to a "beta" Wydmanstätten type laminar structure.

The thickness of this layer 7 of vanadium diluted alloy is very low (less than 1/10 mm).

After cooling, a powder of alloy associated with a binder is then deposited on the vanadium under layer 6.

By weight, this heterogeneous powder comprises one third hard substances which may be titanium carbides, titanium nitrides, or titanium borides, together with a binder constituted by martensitic steel containing chromium (9% to 18%) together with possible additions of molybdenum (1% to 3%) and of cobalt (1% to 8%) in order to confer stainless properties thereto, or an austenomartensitic steel further including 3% to 8% nickel.

The grain size of titanium carbides should be less than 0.5 $\mu$m while the grain size of titanium borides or nitrides should be less than 0.2 μm and preferably about 0.1 μm.

This heterogeneous powder is deposited up to 3 mm or 4 mm from the edges of the vanadium under layer in order to ensure that contact never occurs between the titanium alloy of the vane and the alloy containing titanium carbide, nitride, or boride.

Figure 4:
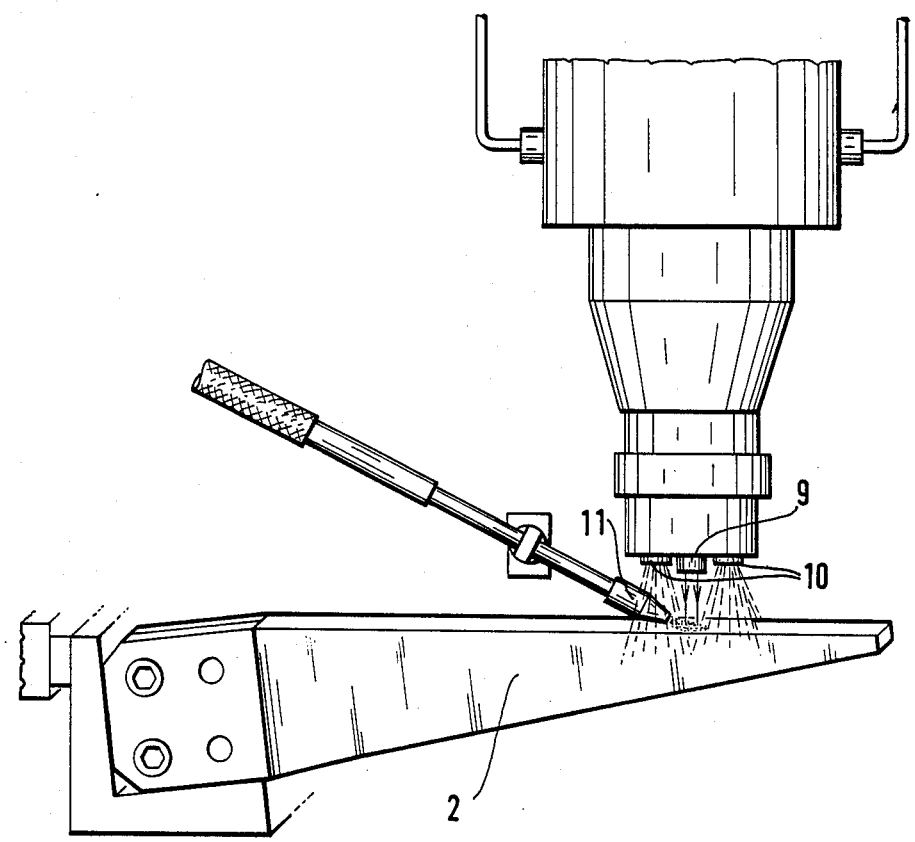
FIG. 4 shows apparatus for implementing the method in accordance with the invention.

When using laser remelting, the FIG. 4 apparatus is used to project the powder onto the vanadium under layer and to melt it by heating it to a temperature which is 50° C. greater than the melting temperature of the alloy (1400° C.–1500° C.). Since this temperature is much less than the melting temperature of vanadium, the alloy layer is diluted very little into the vanadium (see FIG. 3) and the vanadium/substrate bond is kept intact, with the layer 8 of vanadium that includes diluted alloy being very thin (less than 1/10 mm thick).

The layer of deposited alloy is about 1.5 mm thick. Thereafter, conventional strain-releasing treatment is performed at about 700° C. When the binder includes 3% to 8% nickel, the layer based on titanium carbides, nitrides, or borides is subjected to a hardening treatment by being maintained at between 450° C. and 500° C. for a period of four hours in order to obtain an HRC Rockwell hardness which is greater than 60.

When the binder includes less than 3% nickel, the treatment performed consists in quenching at a temperature of more than 1050° C. in a nitrogen atmosphere in order to obtain a Rockwell hardness which is greater than 60.

Although the coating method is preferably implemented by projecting powder in a laser beam while projecting inert gas, it is possible to use other means, in particular to proceed by remelting the powder projected under inert gas by means of a plasma or melting the powder under inert gas using high frequency induction heating.

When using induction heating, it is preferable to use a high frequency induction oven provided with a moving inductor. With the oven under a vacuum or under an inert atmosphere (e.g. argon), and containing the blade, the oven is preheated and then the layer of powder is heated by means of a 30 mm diameter spot while keeping the spot stationary for 20 seconds to 75 seconds and then advancing in 20 mm steps.

As mentioned, the layer of vanadium powder is heated in a first operation in order to melt it. Then, during a second cycle, after the alloy powder has been deposited on the vanadium layer said alloy layer is heated in order to melt it without melting the vanadium.

I claim:

1. A method of applying a protective coating on a titanium alloy blade, wherein the portion of the blade to be coated has pure vanadium powder deposited thereon and the temperature of the powder is raised to a temperature which is slightly higher than the melting point of vanadium in order to form a layer of vanadium, thereafter, a heterogeneous powder mixture is deposited on the vanadium layer, said powder comprising about one third by weight of one material of the group consisting of titanium carbides, titanium nitrides, and titanium borides, bonded by a martensitic or austenomartensitic stainless steel including, in particular, 9% to 18% chromium, the heterogeneous powder being raised to a temperature which is greater than its melting temperature and less than the melting temperature of vanadium.

2. A method according to claim 1, wherein a powder of titanium nitride or titanium boride is used having a particle diameter of about 0.1 μm.

3. A method according to claim 1, wherein the powders are projected and melted under an inert atmosphere using a laser beam.

* * * * *